Oct. 18, 1966    G. RUELLE ETAL    3,280,355
ROTOR RIMS FOR ELECTRICAL MACHINES
Filed Dec. 9, 1963    2 Sheets-Sheet 1
Fig.1
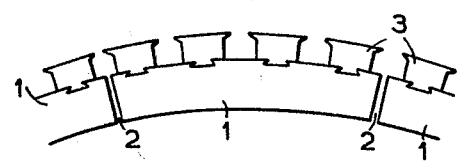
Fig.2
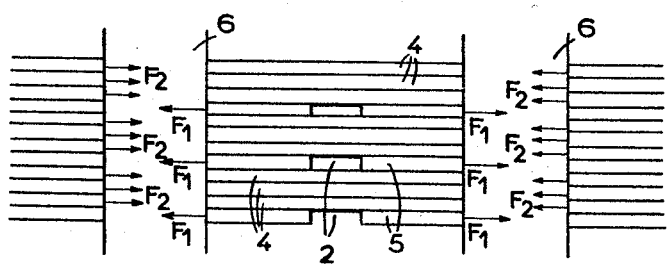
Fig.3    Fig.4
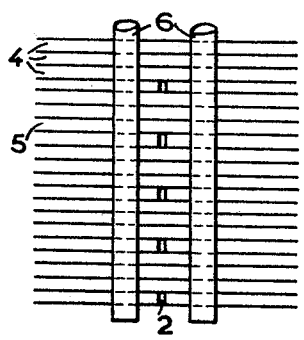    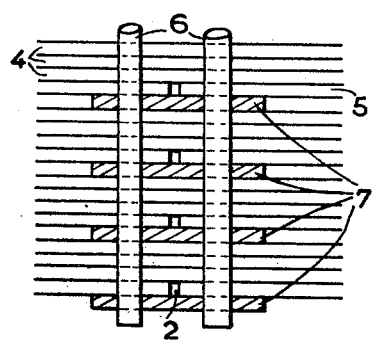
INVENTORS
G. Ruelle
M. Peter
By *(signature)*
ATTORNEYS United States Patent Office 3,280,355
Patented Oct. 18, 1966

3,280,355
ROTOR RIMS FOR ELECTRICAL MACHINES
Gilbert Ruelle and Marcel Peter, both of Belfort, France, assignors to Societe Generale de Constructions Electriques et Mecaniques (Alsthom), Paris, France, a French body corporate
Filed Dec. 9, 1963, Ser. No. 328,928
Claims priority, application France, Dec. 13, 1962, 2,375, Patent 1,354,859
10 Claims. (Cl. 310—269)

The rotors of certain rotary electric machines, particularly of A.C. generators driven by hydraulic turbines, bear round their rims the pole faces and windings forming the inductor portion of such machines. This rim must withstand the mechanical stresses due to the centrifugal force resulting from its own mass and that of the field poles. It must also be of adequate section to permit passage of the inductive magnetic flux. In addition, the pole faces and their windings, the seat of electrical losses, must be provided with forced air cooling.

It is already known to construct such rims from a stack of flat rings cut out from sheet metal, each ring in turn consisting, for design reasons, of an assembly of basic segments. The stack is traversed by clamping studs, and the joints between the segments are offset from one ring to the next to enable the circumferential mechanical junctions of the assembly to be made by means of said studs. The pole faces are dove-tailed and keyed in position.

It is also known to cool such rotors by a double injection of fresh air which reaches each side of the rotor and flows axially between the field poles, towards the middle portion of the rotor. In point of fact, the cooling air gradually escapes in a radial direction through the vents provided in the crown or surrounding portion of magnetic material constituting the stationary armature of the machine. Experience has confirmed that the reduced quantity of air reaching the middle part of the rotor, which consists of air already heated by its flow along the field windings, provides inadequate cooling of the middle portion of the machine, as regards both the rotor or inductor and the stator or armature.

Extra fresh air can be provided for this portion of the machine by the provision of radial vents in the rotor rim, between the field poles thereof. On the other hand, if such vents were to be provided with the section required for the desirable amount of supplementary air, the remaining effective rim section would in most cases be inadequate to withstand the loads due to centrifugal force and to permit passage of the inductive magnetic flux. This has led to the number of vents being kept below the figure that would be required for proper ventilation.

It is the object of this invention to provide a new rotor rim which, without recourse to a costly increase in size, reconciles the several requirements of mechanical strength for the rotor rim, unrestrained passage of the magnetic flux and cooling of the electric machine.

This new rim, comprising a stack of conventional flat rings each formed by assembling together basic segments constituting a plurality of layers assembled by clamping studs, the inter-segment joints being offset from one layer to another, consists essentially in that the stack of said flat rings has, inserted therebetween, layers consisting of shorter and hence non-contiguous segments that form bonds arranged circumferentially opposite the various positions occupied by the joints between normal segments, compensating or overcompensating the mechanical effect of said joints, and joined to the normal segments by the studs securing the rim as a whole.

These layers of shorter segments are preferably not disposed after each positional cycle of the joints between normal segments, but rather after several cycles, in which case they consist of a stack of several thin shortened and superimposed segments, or of thick shortened segments. This disposition enables vents to be provided between the shortened segments or bonds that are wide enough to ensure good ventilation.

Reference to the accompanying schematic drawings will permit comparison of the construction of a conventional rotor rim with one embodiment of this invention, given by way of non-limitative example. In the accompanying drawings:

FIGURE 1 shows a fragmentally, in section and in side elevation, a conventional method of constructing a rotor rim.

FIGURE 2 is a partial longitudinal section taken through the plane of the clamping studs.

FIGURE 3 is a view, on a reduced scale, corresponding to FIGURE 2.

FIGURE 4 shows in partial longitudinal section, taken through the plane of the clamping studs, a rotor rim according to one embodiment of this invention.

Figure 5:
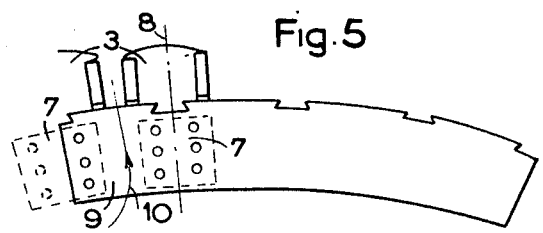
FIGURE 5 is a partial sectional view of the rotor rim of FIGURE 4 in side elevation.

In FIGURE 1, the conventional rim consists of stacked or laminated segments 1 of sheet metal, the intersegment joints 2 being mutually offset (not visible on the figure) from one layer to the next, said segments 1 being clamped together by studs (not shown), and said rim bearing the pole faces 3. The joints 2 are generally disposed on the inter-pole axes.

FIGURE 2 shows the way in which the loads are transmitted in such a rim, assuming there is no friction between the rings or layers of sheet metal. The plates or segments 4 which are not cut at the point under consideration, withstand the disrupting force applied by the internal stresses resulting from their elongation. The pieces or segments 5 of sheet metal, which are cut at 2, transmit the disrupting force directly to the studs 6 along the arrows $F_1$. The studs 6 distribute these loads along the arrows $F_2$, over the $n-1$ sound plates or segments where $n$ is the number of plates or segments corresponding to one positional cycle of the joints 2 (in this case four), as is shown also in FIGURE 3. The uncut plates or segments at this point are thus overloaded in the ratio of $$\frac{n}{n-1}$$

Reference to FIGURE 4 shows that, in accordance with this invention, there have been added, after each positional cycle of the joints 2, shortened segments 7 forming bonds joined to the normal segments 4 and 5 by the studs 6. The number of plates or segments providing one positional cycle of the joints 2 has increased to $n+1$, i.e. to five in the example considered.

For $n(n+1)$ plates or segments, namely twenty in the example considered, the number of plates or segments withstanding the disrupting force would be $$(n-1)\times(n+1)$$

i.e. fifteen in the conventional rim, and $n\times n$, or sixteen in the bonded rim according to this invention.

The mechanical strength of the rim is consequently improved in the ratio of $$\frac{n}{n+1}$$

over $$\frac{n-1}{n}$$

Since, moreover, the weight of the shortened segments or bonds is less than that of the normal plate segments, the disrupting force is reduced. If the order of magnitude of the ratio of the weight of the shortened segments to that of the normal plate segments is 0.7, then the weight and the centrifugal force of the rim will be reduced by 6.7% in the example considered, while its resistance to the disrupting force will be increased by 6%.

Figure 6:
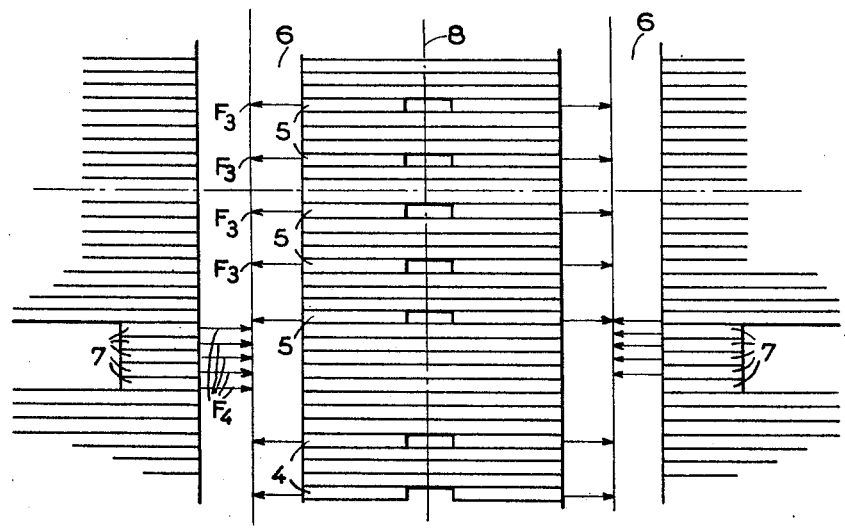
FIGURE 6 is a view corresponding to FIGURE 4, on an enlarged scale.

FIGURES 5 and 6 illustrate embodiments wherein the joints between the normal plate segments, and hence the shortened segments producing the bonds, are positioned on the axes 8 of the pole faces 3. The gaps 9 between the shortened segments 7 are thus so located that they can be utilized for ventilation in the direction of the arrow 10, while the shortened segments 7 can fulfill the function of fan blades. The contact section between the base of each pole face 3 and the rim is furthermore entirely available for passage of the inductive magnetic flux, it being understood that the shortened segments are at this point flush with the external face of the rim and are made of a magnetic material.

Within certain limits, the number and width of the vents thus provided along the stack can be chosen at will. It may be advantageous to provide a smaller number of wider vents, since the resistance to the flow of air will be greater, for a given air velocity, in narrow vents. Wide vents lead to the use of thick shortened segments or bonds, consisting, for instance, either of a stack of thin plates, or of a single thick piece. Accordingly, the joints between normal plate segments are not compensated after each group of plate layers corresponding to one positional cycle of the joints, the compensation being instead concentrated on a smaller number of plate layers.

FIGURE 6 shows the manner of load transmission in a rim with bonds or shortened segments 7 according to this invention, in the specific case where compensation by means of bonds is concentrated in thick bonds consisting of a stack or several plates. The cut plates 5 transmit their disrupting forces to the studs 6 along the arrows $F_3$, which studs apply them to the bonds or segments 7 along the arrows $F_4$.

This permits of overcompensating the joints and providing a number of bond segments in excess of the number of joints to be compensated. When this is the case, the proportion of vents will be greater than $$\frac{1}{n+1}$$

and the stresses in the pole and inter-pole axes will be different.

The embodiments which are the object of this invention maybe applied partially only, without departing from the spirit and scope of the invention as it is hereinafter defined in the appended claims.

We claim:
1. A rotor rim for rotary electric machines, comprising a stack of flat rings, each constituted by assembling basic segments forming layers, assembled together by clamping members, the joints between said basic segments being mutually offset from one layer to the next, wherein there are interposed in said stack of flat rings, layers formed by shortened and hence noncontinguous segments constituting bonds arranged circumferentially opposite the various positions occupied by the joints between said basic segments, whereby to compensate or overcompensate the mechanical effect of said joints, the said shortened segments being joined to the normal segments by means for clamping together the rim as a whole.

2. A rotor rim according to claim 1, wherein the spaces provided between circumferentially spaced, bond-constituting, shortened segments constitute radial ventilation ducts.

3. A rotor rim according to claim 1, wherein the joints between said basic segments, and hence the bond-forming, shortened segments, are disposed on the pole axes.

4. A rotor rim according to claim 1 wherein the layers of bond-forming, shortened segments are grouped together in thick layers instead of being distributed after each positional cycle of the joints between basic segments.

5. In or for an electric machine, a segmental rotor including; a rotor rim comprising a stack of flat metal ring laminations, each ring consisting of a number of basic segments, the joints between the basic segments of each ring being mutually offset circumferentially from one ring to the next; layers of non-contiguous shortened segments interposed between some of said rings with spaces defining radial ventilation ducts between said shortened segments of each layer circumferentially spaced with respect to said joints between adjacent basic segments of adjacent rings; clamping members, extending through the basic and shortened segments, clamping said shortened segments to said basic segments and assembling said rings together in said stack; and poles carried by said rotor rim, overlying said shortened segments and circumferentially offset with respect to said ventilation ducts.

6. Apparatus according to claim 5, wherein each layer of shortened segments, is relatively thin, and is positioned between said rings after each positional cycle of the joints.

7. Apparatus according to claim 5, wherein each layer of shortened segments is relatively thick and is positioned between said rings after a plurality of positioned cycles of said joints.

8. Apparatus according to claim 7, wherein each shortened segment comprises a stack of plates.

9. In or for an electric machine, a salient-pole segmental rotor including; a rotor rim, comprising a stack of flat metal rings each divided into basic segments disposed with the joints therebetween mutually circumferentially displaced from one ring to the next; metal non-contiguous shortened laminated segments between said rings after a predetermined number of positional cycles of said joints, overlapping said joints; clamping studs passing through said shortened and basic segments together in said stack; poles carried by said rotor rim; and air ducts between said poles, defined by the circumferentially extending spaces between circumferentially spaced shortened segments.

10. In or for an electric machine, a segmental rotor including; a rotor rim comprising a stack of flat metal ring laminations, each consisting of a number of basic segments, the joints between said basic segments being mutually offset circumferentially from one ring to the next; layers of non-contiguous shortened segments interposed between some of said rings with the spaces between said shortened segments of each layer being circumferentially offset with respect to said joints between adjacent basic segments of adjacent rings; and clamping studs passing through said basic and shortened segments, clamping said shortened segments to said basic segments and assembling said rings together in said stack; and poles carried by said rotor and circumferentially offset with respect to said joints each said shortened segment consisting of a single plate positioned between said rings after each positional cycle of said joints.

References Cited by the Examiner
UNITED STATES PATENTS

| | | | |
|---|---|---|---|
| 725,773 | 4/1903 | Reist | 310—269 |
| 928,037 | 7/1909 | Frost | 310—269 |
| 1,033,379 | 7/1912 | Burke | 310—269 |
| 1,808,572 | 6/1931 | Reist | 310—269 |

MILTON O. HIRSHFIELD, *Primary Examiner.*

L. L. SMITH, *Assistant Examiner.*